Figure 1:
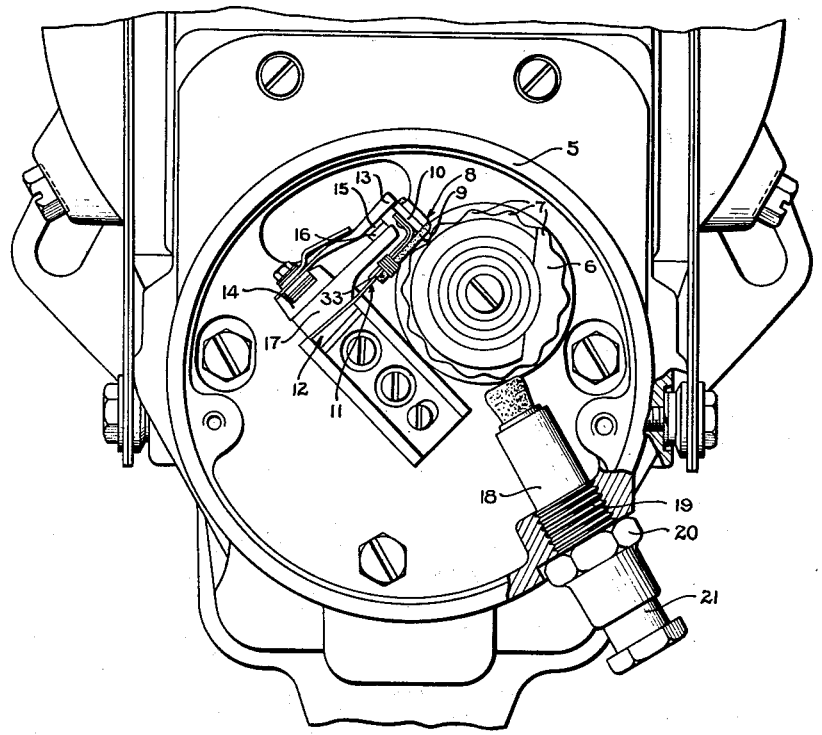

Dec. 2, 1941.   T. TOGNOLA   2,265,047

LUBRICATING MEANS

Filed Oct. 21, 1939

INVENTOR
Tullio Tognola
BY
F. Bascom Smith
ATTORNEY

Patented Dec. 2, 1941

2,265,047

UNITED STATES PATENT OFFICE 2,265,047

LUBRICATING MEANS

Tullio Tognola, Sidney, N. Y., assignor to Bendix Aviation Corporation, South Bend, Ind., a corporation of Delaware Application October 21, 1939, Serial No. 300,566

9 Claims. (Cl. 184—102)

This invention relates to lubricating means and more particularly to apparatus for applying a lubricating medium to a machine part, such as the operating cam of a circuit breaker mechanism.

In a circuit breaker mechanism, for example, of the type comprising a rotary cam and a follower adapted to make and break the circuit between a movable contact and a fixed contact, it is highly desirable to lubricate the surface of the cam and equally desirable to limit the quantity of lubricant applied thereto. In the event of excessive lubrication the cam is apt to throw the excess oil off and onto the contacting surfaces of the contact points and thus seriously affect the operation of the circuit breaker. In practice this is particularly true in devices wherein a lubricant is continuously applied to the cam surface as by means of an oil-soaked wick engaging the cam surfaces, since, unless the quantity of lubricant carried by the wick is carefully controlled, an excessive amount thereof is deposited on the cam surface. In devices of this character control of the quantity of oil carried by the wick is difficult because only a small quantity of oil will produce an excessive saturation and mechanics applying the lubricant have no way of determining the quantity of lubricant carried by the wick at the time of application. Thus, defective operation of the circuit breakers is a frequent occurrence offsetting the attendant advantages of lubrication. Also, very often the point of lubrication is positioned in such a way that it is impossible for the operative to see how much oil he is applying. Difficulty may be experienced also in some installations in applying the lubricant to the desired point unless utmost care is used, and oil that does not find its intended mark may get onto parts which will not function properly when coated with oil.

Accordingly, it is an object of the present invention to provide novel apparatus whereby a predetermined quantity of lubricant can be applied to a surface and whereby the above disadvantages of excessive lubrication are obviated.

Another object of the invention is the provision of novel lubricating apparatus adapted to apply a predetermined maximum quantity of lubricant despite variations in manual actuation of the device.

A further disadvantage of prior methods and devices for lubricating rotary members of circuit breakers was the necessity for removing the cover of the casing which invariably enclosed the circuit breaker before the lubricant could be applied to the cam or the wicks associated therewith. Frequently the breakers were located in places difficult to get at and accordingly it required a substantial amount of time and effort on the part of a skilled mechanic to accomplish the necessary oiling. This tedious operation enhanced the tendency to apply an excessive amount of oil once the casing cover was removed.

Accordingly, a further object of the present invention is to provide a novel apparatus readily accessible from the exterior casing enclosing the part to be lubricated whereby a lubricant may be applied to said part without removing the casing cover.

A still further object is to provide a novel lubricating apparatus associated with a circuit breaker casing, said apparatus being readily removable from said casing for inspection or replacement.

Another object is to provide novel manually operable oil applying means adapted to be conveniently and easily actuated with a minimum of effort and skill.

The above and further objects and novel features of this invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

Figure 2:
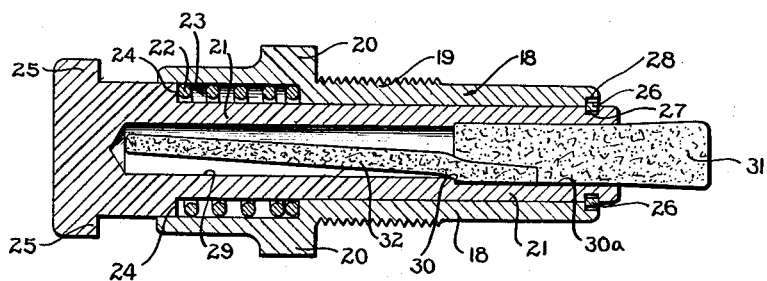

In the drawing, wherein like reference characters refer to like parts throughout the several views:

Fig. 1 is an elevation view, partly in section, and with parts broken away of an embodiment of the novel lubricating apparatus operatively associated with a circuit breaker mechanism of a magneto generator; and Fig. 2 is an enlarged sectional view of said apparatus, the section being taken substantially along the longitudinal axis thereof.

A single embodiment of the present invention is illustrated in the drawing, by way of example, in combination with a form of circuit breaker comprising a casing 5, shown with the cover therefor removed, wherein a cam 6 having a plurality of lobes 7 is mounted for rotation at a velocity determined by the desired frequency of circuit interruptions. A cam follower 8 comprises an insulating block 10, the lower edge of which is in yielding engagement with the periphery of cam 6 which is secured to one end of a flat resilient, supporting arm 11, the other end of said arm being fixed to an adjustable stationary support 12. The upper end of member 10 is adapted to engage the free end of a resilient arm 13 which is secured at the other end thereof on an insulating block 14 which is supported on member 12. As shown, arm 13 carries a contact 15 that is electrically connected in the circuit to be interrupted. A stationary contact 16, also electrically connected in said circuit and adapted to be engaged by contact 15, is mounted on an arm 17 extending from and fixed to support 12. Contact 16 is preferably connected to ground through arm 17 and support 12 while contact 15 and arm 13, which are insulated from arm 17 by means of block 14, are electrically connected to the primary winding of a magneto coil (not shown) or other suitable source of electrical energy. In operation the rotation of cam 6 pivots supporting arm 11 and thereby reciprocates lifting member 10 which in turn actuates arm 13 to make and break the electrical connection between contact 15 and 16 at a desired frequency. Preferably, lug 9 continually engages cam 6, supporting arm 11 being adapted to apply a sufficient pressure upon lug 9 in the direction of the center of said cam to maintain said lug in substantial engagement with the cam. This necessarily results in the creation of considerable frictional force between the cam and the follower which, in turn, results in a substantial wearing away of the parts unless the same are properly lubricated.

Novel means are provided for lubricating the cam surface to decrease the frictional resistance between cam and follower and in the illustrated embodiment said means comprise a shell or barrel 18 threaded along a portion 19 of the exterior thereof and preferably provided with a polygonal shaped shoulder 20 at the base of said threaded portion in order to facilitate proper installation and removal thereof by means of a wrench or other similar tool. Shell 18 is operatively positioned by being threaded into an opening provided therefor in casing 5 and extends into said casing in the direction of cam 6 (Fig. 1).

A tubular member 21 is slidably mounted within shell 18 and resilient means, normally under compression, are preferably interposed therebetween. As shown, said resilient means comprise a coil spring 22 (Fig. 2) surrounding member 21 and located in an annular space 23 between shell 18 and member 21, the space being created by increasing the diameter of the bore in said shell for a portion of the length thereof and by providing said member with an enlarged portion to produce a shoulder 24. Spring 22 is thus interposed between external and internal shoulders on said member and shell, respectively. An annular radially extending flange 25 is located at the outer end of member 21 adjacent said shoulder for the purpose of limiting the movement of said member in one direction relative to the shell. To prevent the ejection of member 21 from said shell in the other direction by the expansion of spring 22, the end of said member is provided with a suitable stop. The latter preferably comprises a locking ring 26 of rectangular cross-section mounted in a groove 27 formed in said member and projecting radially therefrom to the end of shell 18. The latter may be provided with a groove 28 into which the projecting portion of ring 26 is adapted to fit.

Member 21 is provided with a central bore or recess 29 extending substantially the length thereof and being provided with an annular shoulder 30 produced by an increase in the bore diameter in a portion 30a of the bore adjacent the open end thereof. Portion 30a is entirely filled or plugged with a wick 31 of suitable lubricant absorbing material, such as felt, said wick extending beyond the end of member 21 to within a short distance of cam 6. The remainder of bore 29 is adapted to be filled with a suitable liquid lubricant and a wick element 32 which may be formed integrally with wick 31 or as a separate element. As shown, wick element 32 extends the length of said bore from wick 31 and is closely associated with said wick for a portion of the length thereof by being fixed between said wick and the wall of said bore. Wick element 32 transmits the oil or other lubricant within bore 29 to wick 31 when the latter is not in direct contact with the lubricant. Thus, a wick saturated with a lubricant is normally in close proximity to, but does not touch, the surface of cam 6.

Oil may be deposited on cam 6 when the latter is stationary by manually pressing member 21 in the direction of casing 5 to cause wick 31 to engage the cam surface. As the wick engages the cam surface and pressure is applied thereto through member 21 a quantity of oil is deposited on the cam by the wick. As member 21 is released the sponge action of the wick tends to absorb any excess oil which may have been deposited on the cam leaving only a single spot of oil thereon, about the equivalent of one drop spread over an area determined by the cross-sectional area of the wick, irrespective of variations and pressure applied to assembly 21, 31 and irrespective of the number of times the same is depressed against a cam support on the cam surface. Only about one drop of oil is finally deposited, an amount which has proved very efficient in actual practice when applied at suitable operating intervals. Thus, only a limited quantity of oil may be deposited on said cam surface even by careless operatives despite variations in the manual operation of the lubricating mechanism and this quantity must necessarily be deposited at the desired place without danger of contaminating other parts.

After the lubricant is deposited on a portion of the cam periphery and the circuit breaker begins to operate, the oil is spread in a uniform film over the entire periphery of the cam by the follower block 9, 10. However, it may be desirable in some instances to mount an element 33 of oil soaked absorbent material on said follower in a position to engage the peripheral surface of said cam for the purpose of spreading the oil and to absorb a limited quantity of oil to replace that which subsequently evaporates or is wiped off the cam by the follower.

The lubricating mechanism carried by shell 18 is preferably mounted, as shown, beneath the rotary member it is adapted to lubricate. However, it is to be understood that the mechanism is effectively operable although mounted at some point above the rotary member so as to extend downwardly in the direction of said member. The lubricant carried in bore 29 will not drop freely through wick 31 even when the latter is beneath said bore.

There is thus provided a novel lubricating apparatus operable to deposit a limited quantity of lubricant on the surface of the rotary cam of a circuit interrupter or similar machine part, said quantity being sufficient to properly lubricate the cam or part but not excessive so as to be thrown off and caused to coat the contacts of the interrupter and render the latter inoperative. The apparatus, although manually operable, eliminates the possibility of substantial variations in the quantity of lubricant deposited on the cam despite variations in the operation of the device by different operators. Furthermore, the lubrication apparatus is compact, readily assembled, simple to operate, economical to manufacture and is accessible from the exterior of the casing surrounding the circuit interrupter.

Although only a single embodiment of the present invention has been illustrated and described, it is to be expressly understood that the same is not limited thereto. For example, it will now be understood by those skilled in the art that the wick carried by the reciprocable member may completely fill the bore of said member and be saturated with lubricant. Various other changes may be made in the design and arrangement of parts without departing from the spirit and scope of the invention. For a definition of the limits of the invention reference is had primarily to the appended claims, it being understood that the word "wick" is used broadly to mean any lubricant absorbent material.

What is claimed is:

1. In electrical circuit breaker apparatus the combination with a rotary cam and a casing enclosing said cam of wick means operable from the exterior of said casing for depositing a predetermined quantity of lubricant on the surface of said cam, and resilient means for normally holding said wick means out of engagement with said cam.

2. The combination with breaker mechanism comprising a rotary cam of means operable to deposit a quantity of lubricant on the surface of said cam, said means comprising a supporting member, a hollow member movably mounted in said supporting member and an absorbent element mounted on said movable member and normally extending to within a short distance of said cam surface, said element being saturated with a lubricant and adapted to be moved by said movable member into engagement with said cam surface.

3. The combination with an electrical circuit breaker mechanism comprising a cam and cam follower, of means operable to deposit a quantity of lubricant on the surface of said cam, said means comprising a supporting member, a hollow member reciprocably mounted in said supporting member, an absorbent element having one end filling a portion of the hollow of said member and the other end normally extending to within a short distance of said cam surface, another absorbent element connected to said first element and extending further into the hollow of said member, and a quantity of liquid lubricant in said hollow.

4. In apparatus for lubricating an element enclosed in a casing, a barrel fixed to and extending within said casing, an open-ended tubular member movably mounted in said barrel, lubricant saturated wick means carried by said tubular member, said wick means being adapted to deposit a limited quantity of lubricant upon said element when said means are moved into contact therewith by said tubular member, and resilient means for normally holding said wick means out of contact with said element.

5. In apparatus for lubricating a member enclosed in a casing, lubricant saturated absorbent means adapted when engaging said member to deposit a quantity of lubricant thereon, and mechanism carrying said absorbent means and including resilient means for normally holding said absorbent means out of contact with said member, said mechanism being mounted in said casing and operable from the exterior thereof to cause said absorbent means to engage said member.

6. In apparatus adapted to apply a quantity of lubricant to a surface, a casing fixed relative to said surface, a mechanism movably mounted in said casing, said mechanism being provided with a chamber wherein a lubricant is stored, absorbent means carried by said mechanism and having a portion thereof dipped in said lubricant and a portion extending from said mechanism in the direction of said surface, and resilient means normally maintaining said absorbent means free of said surface, said mechanism being adapted for movement against the force of said resilient means whereby said absorbent means is caused to engage and moisten said surface with lubricant.

7. In a circuit breaker apparatus comprising a cam member enclosed in a casing, a shell fixed to and projecting into an opening in said casing, a member reciprocably mounted in said shell and operative from the exterior of said casing, said member having a recess therein for containing a lubricant, lubricant absorbent means mounted in said reciprocable member, said means being adapted to convey a predetermined quantity of lubricant from said reciprocable member to said cam member when said reciprocable member is actuated, and resilient means for normally holding said absorbent means out of engagement with said cam member.

8. In lubricating apparatus of the class described, a stationary member, lubricant containing means movably mounted in said member, wick means adapted to convey lubricant from said containing means to a surface engaged by said wick means, and resilient means interposed between said stationary member and said containing means, said resilient means normally maintaining said lubricant conveying means out of contact with said surface.

9. In apparatus of the class described, a support, a recessed element slidably mounted in said support, resilient means normally tending to impart relative movement to said element and support, means for limiting the movement of said element relative to said support by said resilient means, a wick in said recess and projecting therefrom, and a liquid lubricant in said recess for soaking said wick, said resilient means being effective to normally hold said wick out of engagement with a surface to be contacted thereby.

TULLIO TOGNOLA.